Patented June 24, 1930

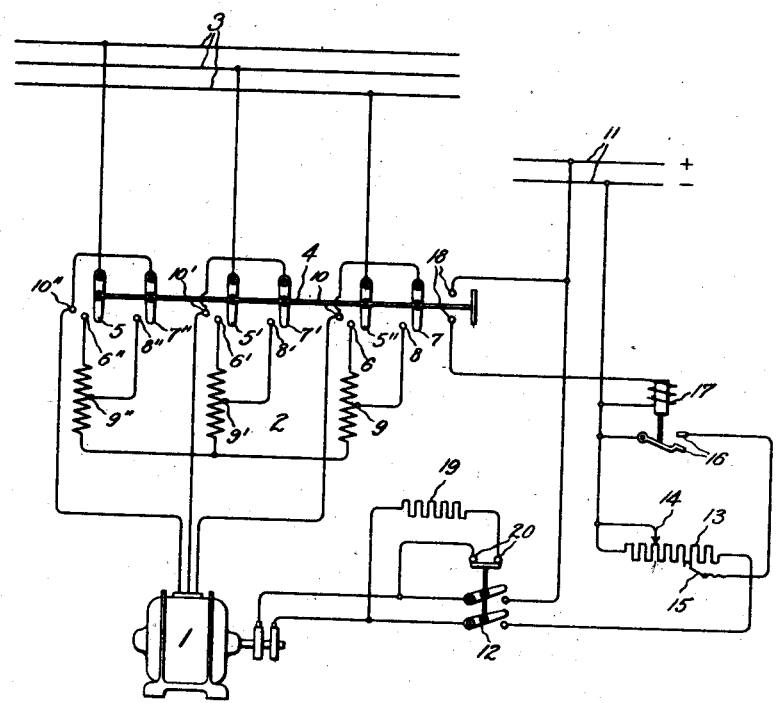

1,768,423

UNITED STATES PATENT OFFICE

HAROLD T. SEELEY, OF SCHENECTADY, NEW YORK, ASSIGNOR TO GENERAL ELECTRIC COMPANY, A CORPORATION OF NEW YORK

CONTROL SYSTEM

Application filed April 28, 1926. Serial No. 105,277.

My invention relates to control systems for dynamo-electric machines and particularly to systems for controlling synchronous dynamo-electric machines such as synchronous motors, converters, condensers, etc.

A synchronous motor and the like is usually started from rest by being connected to a source of alternating current through suitable voltage reducing means so that only a fraction of the normal running voltage is impressed upon the armature winding of the machine during the starting operation. After the machine has started and has reached a predetermined condition, the starting connections between the machine and the alternating current source are changed to the running connections so that normal running voltage is impressed upon the armature winding of the machine. The field winding of the machine is usually supplied with direct current to pull the machine into synchronism before the transfer is made from the low voltage connections to the high voltage connections.

For each synchronous machine there is a certain value of field current which gives the least alternating current disturbance during the transfer from the starting to the running voltage connections. Therefore, during the starting operation of the machine it is desirable to have a predetermined fixed value of resistance in the field current which, after it has once been adjusted to the proper value, cannot be readily adjusted. After the machine has been started and its alternating current running connections have been made, it may be desirable to adjust the resistance of the field circuit to a different value to change the pull out torque or for power factor control or for some other reason.

One object of my invention is to provide an improved control system for the field circuit of a synchronous machine whereby the amount of resistance in the field circuit during the starting period is fixed and is of such a value as to produce the least disturbance in the alternating supply circuit when the transfer from starting to running voltage is made and whereby the amount of resistance in the field circuit is readily adjustable after the running connections of the machine have been made.

My invention will be better understood from the following description, taken in connection with the accompanying drawing, and its scope will be pointed out in the appended claims.

In the accompanying drawing, which diagrammatically shows a control system for a synchronous motor embodying my invention, 1 represents the synchronous motor whose armature winding is adapted to be connected by any suitable switching means either manually or automatically controlled and examples of which are well-known in the art, either to the low voltage terminals of a compensator 2 or to the main alternating current supply circuit 3. In order to simplify the drawing, the switching means is shown as a manually controlled switch 4 having three positions which will be referred to as the off position, the starting position, and the running position. In actual practice however, the switching means usually comprises two electrically controlled switches, one of which is closed during the starting operation and the other of which is closed during the running operation. The switch 4 is shown in the off position in which position all of the circuits controlled thereby are open. When the switch 4 is in the starting position, contacts 5, 5', 5" are respectively in engagement with contacts 6", 6', 6, so that the compensator 2 is connected across the supply circuit 3 and contacts 7, 7', 7" are respectively in engagement with contacts 8, 8', 8" so that the armature winding of the motor is connected to the low voltage terminals 9, 9', 9" of the compensator. When the switch 4 is in its running position, the contacts 5, 5', 5" are respectively in engagement with contacts 10", 10', 10 so that the armature winding of the motor is connected directly to the supply circuit 3.

The field winding of the motor 1 is arranged to be connected to a suitable source of direct current 11 by a suitable switch 12. A resistor 13 is provided in the field circuit of the motor and has a tap 14 and an adjustable contact 15. The tap 14 is set at a point on the resistor so that the field current during the starting operation is of such a value that the least disturbance is produced in the alternating current supply circuit 13 when the transfer from starting to running voltage connections is made. The tap 14 is arranged in any suitable manner, examples of which are well-known in the art, whereby it is not readily changed from one position on the resistor to another. In actual practice, the position of this tap is determined by tests, either at the factory or at the time the machine is installed, and then the tap is bolted to the resistor at the proper point so that it cannot be readily changed after the machine has been put into service.

The adjustable contact 15 is arranged in any suitable manner, examples of which are well-known in the art, so that it may be readily adjusted from one point on the resistor 13 to another. The adjustable contact 15 is in a circuit which also includes contacts 16 of a relay 17, which in turn is arranged to be connected across the direct current circuit 11 by auxiliary contacts 18 on the switch 4 when it is in the running position. When the contacts 16 are closed, the circuit through the contacts 15 and 16 complete a shunt around a portion of the resistor 13 so that the amount of resistance in the field circuit of the motor may be readily varied, after the relay 17 is energized, by the switch 4 being moved into its running position. 19 is a field discharge resistor which is connected across the terminals of the motor field winding by the auxiliary contacts 20 on the field switch 12.

The operation of the arrangement shown is as follows: When it is desired to start the motor, the switch 4 is moved to its starting position so that a relatively low alternating current voltage is impressed upon the motor armature winding. The motor starts as an induction motor since the field circuit is short-circuited through the field discharge resistor 19. When the motor reaches a certain speed, the switch 12 is closed to connect the motor field winding across the direct current source 11 with a predetermined amount of the resistor 13, which is determined by the position of the tap 14, in the circuit thereof. After the motor has pulled into synchronism due to its field winding being excited with direct current, the switch 4 is moved into its running position, in which position the motor armature winding is connected directly across the supply circuit so that normal running voltage is impressed upon the motor armature winding, and the relay 17 is energized to complete the circuit through the adjustable contact 15 on the resistor 13. The motor field current then can be adjusted to any desired value by varying the position of the adjustable contact 15 on the resistor 13.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a synchronous dynamo-electric machine, a source of alternating current, a switch for connecting said source and said machine, a source of direct current, a resistor, switching means for connecting the field winding of said machine and a fixed portion of said resistor in series across said direct current source, an adjustable contact on said resistor, and means responsive to a predetermined position of said switch for connecting said adjustable contact in the field circuit of said machine whereby the field current may be varied.

2. In combination, a synchronous dynamo-electric machine, a relatively low alternating current voltage source, a relatively high alternating current voltage source, switching means for connecting said relatively low alternating current voltage source and said relatively high alternating current voltage source to the armature winding of said machine, a fixed resistor, an adjustable contact on said resistor, a source of direct current, switching means for connecting the field winding of said machine and said fixed resistor in series across said direct current source irrespectively of the position of said adjustable contact, and means responsive to the connection of said relatively high voltage source to the armature winding of said machine by said first mentioned switching means for connecting said adjustable contact in the field circuit of said machine.

3. In combination, a synchronous dynamo-electric machine, a relatively low alternating current voltage source, means for connecting said relatively low alternating current voltage source to the armature of said machine, a source of direct current, a resistor, means for connecting the field winding of said machine and a predetermined fixed portion of said resistor in series across said direct current source, a relatively high alternating current voltage source, means for connecting said relatively high alternating current voltage source to the armature of said machine, an adjustable contact on said resistor, and means responsive to the connection of said relatively high alternating current voltage source to said armature winding for completing a circuit through said adjustable contacts whereby the field current of said machine may be readily varied by varying the position of said adjustable contact.

4. In combination, a synchronous dynamo-electric machine, a relatively low alternating current voltage source, means for connecting said relatively low alternating current voltage source to the armature of said machine, a source of direct current, a resistor, means for connecting the field winding of said machine and said resistor in series across said direct current source, a tap on said resistor arranged so that a predetermined fixed portion of said resistor is connected in the field circuit of said machine during the starting operation of the machine, a relatively high alternating current voltage source, means for connecting said relatively high alternating current voltage source to the armature of said machine, an adjustable contact on said resistor, and means arranged to be operated in response to the connection of said relatively high voltage source to the armature of said machine for connecting said adjustable contact in the field circuit of said machine whereby the field current may be readily varied by changing the position of said adjustable contact on said resistor.

5. In combination, a supply circuit, a synchronous dynamo-electric machine, means for establishing starting and running connections between said machine and said supply circuit, and means responsive to the establishment of the running connections for controlling the excitation of said machine whereby, while running, the excitation of said machine may be adjusted, and while starting, the excitation may be a predetermined value which is independent of the running adjustment.

6. In combination, a supply circuit, a synchronous dynamo-electric machine, means for establishing starting and running connections between said machine and said supply circuit, means for controlling the excitation of said machine whereby the excitation of said machine may be a predetermined value during starting and may be adjusted during running, and means responsive to the establishment of the running connections between said machine and supply circuit for rendering the running adjustment of said excitation controlling means operative and independent of the predetermined value of excitation.

In witness whereof, I have hereunto set my hand this 26th day of April, 1926.

HAROLD T. SEELEY.